United States Patent Office 3,111,506
Patented Nov. 19, 1963

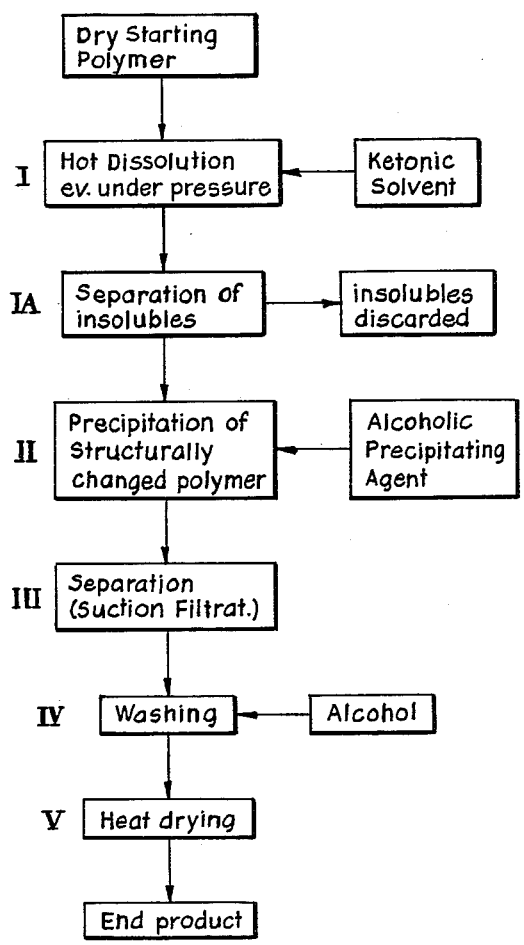

3,111,506
PROCESS FOR IMPROVING THE PROPERTIES OF VINYL CHLORIDE POLYMERS
Gaston Roussillon, La Courneuve, and Marcel Riou, Neuilly-sur-Seine, France, assignors to Pechiney, Compagnie de Produits Chimiques et Electrometallurgiques, Paris, France
Filed July 7, 1958, Ser. No. 746,943
Claims priority, application France July 15, 1957
1 Claim. (Cl. 260—87.5)

This invention relates to a process for improving the properties of non-reticulated polyvinylchloride polymer material, and copolymeric material containing substantial amounts of such polyvinylchloride.

It is an object of our invention to improve the solubility at room temperature, the acceptance in the cold with plasticizing agents, the rapid and homogeneous plastification at elevated temperatures, the freedom from coloring, the transparence, and related physical properties, of non-reticulated polyvinylchloride and copolymeric material containing substantial amounts of the same, as well as of articles manufactured from such plastic materials.

Polyvinylchloride and its copolymers suffer from the drawbacks of offering certain difficulties to processing subsequent to its catalytic production. Thus, these plastic materials tend to lose their colorless aspect and transparency; they are difficult to dissolve in the cold or at room temperature; they accept plastifying agents in the cold only with difficulty, and show generally a certain lack of homogeneity and stability of their physical properties when the material has been shaped into finished articles by means of the known processing methods.

We have discovered that these drawbacks of polyvinylchloride material and copolymers containing substantial amounts of such material can be eliminated and that these materials can be surprisingly improved as set forth above as the object of our invention, by a treatment according to the process of our invention. This process comprises the steps, shown diagrammatically in the accompanying flowsheet, of:

(I) Dissolving the crude material in a ketonic liquid solvent preferably under elevated pressure at a temperature exceeding the boiling point of the solvent at normal pressure, and (II) Adding an alcoholic liquid, which is miscible with the ketonic solvent, to the polymer solution so as to precipitate a finely divided polymer material from the solution, which has undergone a structural or texture change resulting in the desired improved physical properties of the polymer.

The crude polymer material may be prepared in an aqueous or the like suspension or, an emulsion or a crude polymerizate obtained directly from a catalytical process, and be available, after drying, as a solid mass, or pearls or in the like crude, dried state.

The dissolving step is preferably carried out in an autoclave and, depending on the exact nature and origin of the starting polymer, by heating, or by heating under the pressure, in order to exceed the boiling point, under normal pressure, of the solvent, without deteriorating the polymeric material.

The dissolution of the starting polymer is carried out with strong ketonic solvents for polyvinylchloride polymers and copolymers, such as acetone, methylethylketone, cyclohexanone, similar liquid ketones having boiling points below or maximally of about 200° C., or mixtures of such ketones with each other.

Any insoluble residue is separated from the solution by filtration, for instance under suction, centrifugation or the like. The filtration or the like separation step as well as the subsequent precipitation step may be effected at normal pressure, and the former step also at a pressure above normal, where the nature of the polymerizate solution requires the same.

The clear solution obtained by this first step of dissolution in a ketonic solvent and, if necessary, subsequent clarification by filtration or the like, is perfectly stable even after cooling down to room temperature and no precipitation is formed in the same in the latter temperature range.

The subsequent precipitation of the physically improved and structurally changed polymer is effected with an alcoholic solvent miscible with the ketonic solvent but in which the polymer is substantially insoluble. Among these alcoholic solvents, methanol, ethanol, propanol, butanol, and similar aliphatic alcohols having boiling points below or maximally of about 150° C., are particularly suitable.

The alcohol may be used pure, or in aqueous dilution, or in mixture with a portion of the solvent used for the dissolution step, in order to avoid local precipitations of larger agglomerates. In order to avoid the latter drawback, it is also recommendable to stir the solution strongly during the precipitation step, for instance at speeds of a few revolutions per minute, depending on the shape of the agitator, but always avoiding splashing of polymer droplets against the walls of the vessel above the liquid level.

The finely divided precipitate consists of particles having grain sizes varying relatively little from an average grain size so that the granulate is very highly homogeneous. The average grain size itself may vary within relatively wide limits, for instance from 5 to about 200 microns. The precipitate is then (III) filtered or decanted, (IV) washed with alcohol or an aqueous alcoholic mixture and finally (V) dried by heating.

Polymeric materials, the properties of which can be improved by this process, are polymers and copolymers on a polyvinyl basis such as polyvinylchlorides prepared in suspension or emulsion, copolymers of vinylchloride with vinyl acetate, in particular those copolymers rich in the polymerized vinyl chloride share, copolymers of vinylchloride and vinylidene chloride and again in particular those rich in polyvinylchloride content.

The viscosity values given below as characterized of the polymeric materials used are those of Staudinger's "relative" or "intrinsic" viscosity as defined, for instance in "Vinyl and Related Polymers," by Schildknecht (1952), p. 30.

This process of the invention shall be further illustrated by a number of examples of carrying the same out in practice, which examples are, however, not to be considered as limitative of the scope of the invention.

*Example I*

500 grams of a copolymer obtained from vinylchloride and vinyl acetate which copolymer has a relative viscosity of 0.62 (determined in a solution of 0.5% by weight of the copolymer in cyclohexanone at 20° C.) and is used in spherical partially transparent grains of an average diameter of 200 microns, are dissolved in 1500 grams of acetone under stirring at a speed of 60 r.p.m. in an autoclave, the latter is closed and the mixture is heated for about 2 hours at a temperature of about 80° C. and under a pressure of about 2 kg./cm.$^2$ (kilograms per square centimeter). The resulting solution is filtered through a cotton cloth in order to retain all extraneous impurities and insoluble particles, it is then agitated in an open vessel by means of a stirrer operated at a speed of 60 r.p.m. Pure methanol is then slowly added and the improved copolymer precipitates in the form of small pearls having diameters in the order of 5 to 10 microns which are partly agglomerated to form larger particles of about 30 to 50 microns in diameter.

After about 1500 grams of methanol have been added, the precipitation is terminated and the acetone admixed with about 15 to 20% of its weight of methanol is distilled off.

The precipitate is suction-filtered, washed once with pure methanol, and dried at a temperature of about 50 to 55° C. until its weight remains constant. The relative viscosity of a 0.5% solution of the precipitate in cyclohexanone at 20° C. is 0.64.

The dry copolymer can be dissolved in a few minutes at room temperature (20–25° C.) in a mixture of 1 part by weight of methylethylketone with 1 part of toluene to yield a colorless, clear solution. Films prepared in a conventional manner (by blowing) from this solution are colorless and perfectly transparent.

*Example II*

500 grams of a copolymer of vinylchloride and vinyl acetate and containing 12% of polyvinyl acetate, and obtained in the form of coarse pearls being a mixture of the residue on a one-millimeter mesh sieve, and deposits cleared from the polymerization autoclave, are dissolved in 1500 grams of acetone under stirring in an autoclave provided with an agitator operated at a speed of 70 r.p.m. The autoclave is then closed and the mixture heated during 4 hours to about 80° C. under a pressure of about 2 kg./cm.$^2$.

The resulting turbid solution is freed from residue and insoluble particles by passing the same through a sand filter, and becomes clear.

About 1500 grams of methanol (containing 5% of water) are then added to the solution under stirring in a vesel at 50 r.p.m. The improved copolymer precipitates in a state similar to that described in Example I, and acetone is then distilled off under a slightly reduced pressure of about 500 Torr.

The precipitate is then suction-filerted, washed once with pure methanol, and dried in a stove at about 50 to 55° C. until its weight remains constant.

The dry improved polymer can be dissolved in a few minutes at room temperature in the same manner as described in Example I, and its physical properties are improved in the same manner as those of the polymer resulting from the preceding example.

*Example III*

A copolymer composed of polyvinylchloride and polyvinylacetate containing 13% of the latter and having a relative viscosity of 6.5 (measured in a 0.5% by weight solution of the copolymer in cyclohexanone at 20° C.) is obtained, in a manner known per se, in the form of clodded particles by polymerization of vinylchloride and vinyl acetate in an emulsion in the presence of potassium stearate as emulsifier, a complex salt of potassium persulfate and potasium metabisulfite as initiating agent, and a calcium salt as the coagulating agent.

500 grams of this copolymer are dissolved in the same manner as described in Example II in 1500 grams of acetone, but under stirring at elevated speed of 200 r.p.m.

The resulting solution is opaque and contains numerous insoluble particles. It is therefore filtered through a sand filter consisting of a layer of fine sand of a few centimeters, thickness between two cotton cloths. The solution thereby becomes perfectly clear.

The improved copolymer is then precipitated by adding to the solution about 1500 grams of a mixture of 1 part by weight of methanol and 1 part by weight of water, and further treated as described in the preceding examples.

After drying at a temperature below 55° C., the improved copolymer is obtained in the form of agglomerated particles having average grain sizes in the range of 30 to 50 microns, which show the same improved properties as described in Examples I and II.

*Example IV*

100 grams of a polyvinylchloride having a relative viscosity of 1.1 (measured in a 0.5% solution of the polymer in cyclohexanone at 20° C.) and being the refuse retained on a sieve of one-millimeter mesh fine, are dissolved under stirring at a speed of 60 r.p.m. in 2 liters of cyclohexanone at a temperature of about 60° C.

The resulting solution is filtered through a sand bed filter and then precipitated in the cold by adding thereto 5 liters of methanol (containing 20% of water) under stirring at 50 r.p.m.

The resulting precipitate is then washed twice with methanol, then once with water and then dried at a temperature below 60° C.

While the initial product can only be mixed with a plasticizer with great difficulty and yields even after prolonged treatment at 155° C. only sheets having many faulty, granulated portions (fish-eyes), 50 grams of the end product obtained by the method of our invention, when mixed with a plasticizer consisting of 30 grams of dioctylphthalate and 0.5 gram of barium cadmium stearate yield in the cold a powder which is easy to handle and gels easily at 155° C. when treated in a calender, whereby plastified sheets are obtained which are completely free of physically faulty parts.

*Example V*

Example IV is repeated using, however, only 1.5 liters of cyclohexanone for the dissolution, filtering through the sand bed filter at a temperature of 100° C., and then precipitating with 5.5 liters of a mixture containing 5 liters of methanol and 0.5 liter of cyclohexanone.

*Example VI*

Example I is repeated, however, the precipitation is carried out with 1500 grams of n-butanol instead of methanol.

*Example VII*

Example I is repeated, however, the ketonic agent consists of a mixture of acetone (80% by volume) and methylethylketone (20%) instead of acetone, and the precipitating agent used is propanol instead of methanol.

It will be understood that this invention is susceptible to further modification and, accordingly, it is desired to comprehend such modifications within this invention as may fall within the scope of the appended claim.

What is claimed is:

A process for improving the solubility and stability of homopolymers of vinyl chloride and copolymers of vinyl chloride-vinyl acetate, said polymers being contaminated by emulsifying agents and initiating agent residues, which process comprises the steps of: dissolving the polymers in a ketone selected from the group consisting of dimethyl ketone, methyl ethyl ketone, and cyclohexanone, the dissolution being carried out under supra-atmospheric pressure and stirring, the temperature of the ketone during the dissolution being maintained above the boiling temperature of the ketone when under normal pressure; separating the resulting solution from undissolved contaminants; adding a sufficient quantity of a precipitating liquid comprising an aliphatic alcohol having a maximum boiling point of about 150° C. to the resulting solution to thereby precipitate the polymer free of undissolved contaminants in a finely divided form and in a physically changed state which permits rapid dissolution of the same at room temperature, and separating, washing, and drying said finely divided physically changed polymer.

References Cited in the file of this patent

UNITED STATES PATENTS

| | | |
|---|---|---|
| 2,055,468 | Douglas | Sept. 29, 1936 |
| 2,202,481 | Cox et al. | May 28, 1940 |
| 2,273,140 | Renfrew | Feb. 17, 1942 |

FOREIGN PATENTS

| | | |
|---|---|---|
| 542,288 | Great Britain | Jan. 2, 1942 |
| 509,949 | Canada | Feb. 8, 1955 |

OTHER REFERENCES

Douglas et al.: Ind. and Eng. Chem., vol. 28, pp. 1153–55, 1936.

Schildknecht: Vinyl and Related Polymers, pp. 422 and 426, 1952, Wiley and Sons, New York.

Fuoss: J. Am. Chem. Soc., vol. 63, 2401–9 (1941).

Fuoss et al.: J. Phys. Chem., vol. 47, 59–70 (1943).

Mark et al.: "Physical Chemistry of High Polymeric Systems," 1950, 2nd ed., Interscience Publ., New York, pages 270–274.

Flory: "Principles of Polymer Chemistry," 1953, Cornell University Press, New York, pp. 552–563.